United States Patent [19]
Kellman-Turek

[11] Patent Number: 5,959,793
[45] Date of Patent: Sep. 28, 1999

[54] LAMINATED SAFETY MIRROR WITH REFLECTIVE COATING ADJACENT THE BONDING LAYER

[75] Inventor: Cheri L. Kellman-Turek, Des Plaines, Ill.

[73] Assignee: Globe-Amerada Glass Co., Elk Grove Village, Ill.

[21] Appl. No.: 08/870,307

[22] Filed: Jun. 6, 1997

[51] Int. Cl.[6] ............................. G02B 5/08; G02B 7/182
[52] U.S. Cl. ........................................ 359/883; 359/870
[58] Field of Search .................... 359/870, 883, 359/884

[56] References Cited

U.S. PATENT DOCUMENTS

| | | | |
|---|---|---|---|
| 1,885,232 | 11/1932 | Colbert | 428/622 |
| 2,468,568 | 4/1949 | McCusker | 428/432 |
| 4,343,533 | 8/1982 | Currin et al. | 359/883 |
| 4,511,618 | 4/1985 | Duchene et al. | 428/215 |
| 4,645,714 | 2/1987 | Roche et al. | 428/458 |
| 4,670,338 | 6/1987 | Clemino | 428/312.6 |
| 5,493,483 | 2/1996 | Lake | 362/346 |
| 5,820,988 | 10/1998 | Nagaoka | 428/423.1 |

*Primary Examiner*—Cassandra Spyrou
*Assistant Examiner*—Mark A. Robinson
*Attorney, Agent, or Firm*—Chapman and Cutler

[57] ABSTRACT

A laminated safety mirror comprises at least two layers of glass and a bonding layer. A mirrored coating is formed on the first inner surface of a glass sheet comprising an outer surface of the laminate and, through a protective coating, immediately adjacent the bonding layer. A dual-sided mirror can be formed with two mirrored coatings, one on each of the first inner surfaces of the glass sheets forming the outer surfaces of the laminate. The bonding layer is a light stable bonding polyether-based aliphatic polyurethane material. The laminate so formed is durable against separation of layers and against loss of its bonding strength and safety capabilities. The laminate will meet the strength and other characteristics of, for example, the Consumer Product Safety Code, 16 CFR 1201 category I and II (U.S. Safety Standards) for withstanding up to 400 foot-pounds of impact energy. Soda lime glass, tempered glass, chemically-strengthened glass, colored glass, and other materials can be used in one or more layers of a laminated glass mirror of the invention.

16 Claims, 1 Drawing Sheet

LAMINATED SAFETY MIRROR WITH REFLECTIVE COATING ADJACENT THE BONDING LAYER

BACKGROUND OF THE INVENTION

1. Field of the Invention

The present invention relates to safety glass mirrors, particularly to laminated safety mirrors and glazing, and to methods of forming same.

2. Background of the Invention

Prior known laminated mirrors have had their mirror coatings located at the sides of the glass sheets opposite the bonding layers, because the bonding materials previously used have been incompatible with the silver coating and the protective paint applied over the silver. The result has been diminished brightness of the mirror image produced, due to the great thickness of glass and bonding layer through which light and images must pass. Also, the prior known laminated safety mirrors could not be offered in dual-sided form without making and then enclosing two single-sided safety mirrors in a frame, making them heavy and expensive.

Previous efforts to place the mirror coating adjacent the bonding layer have failed either because the bonding materials attacked the silver coating and the protective paint, reducing functionality and appearance of the mirror with black spots, discolorations, blemishes, and streaks, or because the protective paint attacked the bonding materials, causing delamination and failure to meet safety standards. These problems were significant deterrents, as they compromised the integrity of the product and thus prevented it from being offered as a durable safety material.

No solution has heretofore been found, despite great efforts in the architectural glass industry to do so. Interlayer bonding materials used adjacent the protective coatings on mirrored surfaces, including polyvinyl acetal resin and polyvinyl butyral resin, have been tested and rejected due to such chemical attack and/or deterioration that products made with them failed to meet safety standards. Other known bonding materials such as plasticized polyvinyl acetate, polyacrylic ester, cellulose acetate plastic, and cellulose nitrate adhered with gelatin have also been tried and abandoned due to moisture sensitivity, low temperature brittleness, color, and adhesion durability problems. Some polyurethane based adhesive bonding materials such as aromatic polyurethanes and hot melt urethane bonding materials are not light stable and are susceptible to becoming hazy or discolored under ultraviolet light. These products thus are ineffective as interlayer bonding materials for use in laminated safety glass adjacent the mirror coating and protective layer.

Prior U.S. patents addressing the laminated safety mirror and similar problems include U.S. Pat. No. 2,468,568, which discloses double and single mirrors including polyvinyl-butryal or methyl methacrylate layers and bonding agents of resin, plastic, or gelatin, and U.S. Pat. No. 4,511,618, which discloses laminated reflective panels using thin foils bonded to glass using polyvinylbutryal medium, epoxy resins, silicone-based adhesives, unspecified polyurethane, and hot-melt adhesives.

SUMMARY OF THE INVENTION

The present invention comprises a laminated glass safety mirror made with its reflective coating on the glass side immediately adjacent the outer side of the mirror, wherein the bonding layer for the lamination to the protective coating on the mirror surface is a light stable bonding polyether based aliphatic polyurethane, preferably of a high modulus tensile strength. Both single sided and dual-sided mirrors can be made using the present invention, and either can be used as free-standing divider walls. Any sort of suitable glass can be used, whether soda lime float glass, tempered glass, chemically strengthened glass, colored or opaque glass, and etched or decorated glass, in one or more layers of the safety mirrors of the invention.

The laminated safety mirror of the invention is suitable as a safety glazing material for all doors. It is additionally useful where safety glazing is required by building codes and recognized good practices, such as for free standing floor to ceiling walls, for wall partitions without guards or hand rails or other building materials used as a backing, for shower, tub and pool and other entertainment enclosures, for gymnasiums and dance studios, and within transportation vehicles. It may also be used in furniture and appliances. The mirrored image is a closer and brighter image than afforded by previously known laminated glass mirrors having two glass sheets between the viewer and the mirrored coating. No other attachment or bonding to any other backing material is necessary to provide sufficient structural strength to be considered a safety material.

This invention offers an economical product choice with sufficient thinness that it will fit within common industry door, wall, and even vehicle frame channels This invention provides a laminated mirror proven to offer safety capabilities to prevent human injury from breaking or penetrating through the product. Both the laminated mirror with the mirror facing in one direction only and the dual sided mirror have withstood an impact force equal to 400 foot pounds of impact energy. A specimen of the product, 7.143 mm ($\%_{32}$") nominal overall thickness and of considerable size, 34"×76" (863 mm×1930 mm), was mounted within a frame in accordance with standard test methods, in a vertical position and retained with edge clamps provided. A 100 pound shot bag according to the standard test method was swung from an overhead support to impact the center area of the specimen, with a 48" drop to produce 400 foot pounds of energy force. Both the front and back surfaces of the single mirror specimen were impacted to ensure safety against impact upon either surface. This is the current compliance requirement of 16 CFR 1201, Category II.

The mirror image is closer to the viewer, and thus offers greater brightness and less displacement of the image than prior art laminated safety mirrors. The closer image makes it possible to decorate the top surfaces by sandblasting or etching, although care must be taken to ensure the mirror maintains its safety performance. These advantages may be of particular interest to display and signage industries.

According to this invention, it is possible to use a previously chemically strengthened glass in one or more layers of the laminate, prior to mirror coating, to further strengthen the assembly and thereby reduce potential thermal stress breakage which may arise from heat buildup if placed on a building exterior or like extreme environment. Alternatively, tempered glass may be used as one or more layers if the inevitable image distortion is not objectionable.

It is also possible to use this invention with glass of significantly great thickness, or to bond an interlayer material such as of polycarbonate or acrylic, to provide security in addition to safety performance.

THE PREFERRED EMBODIMENTS

Figure 1:
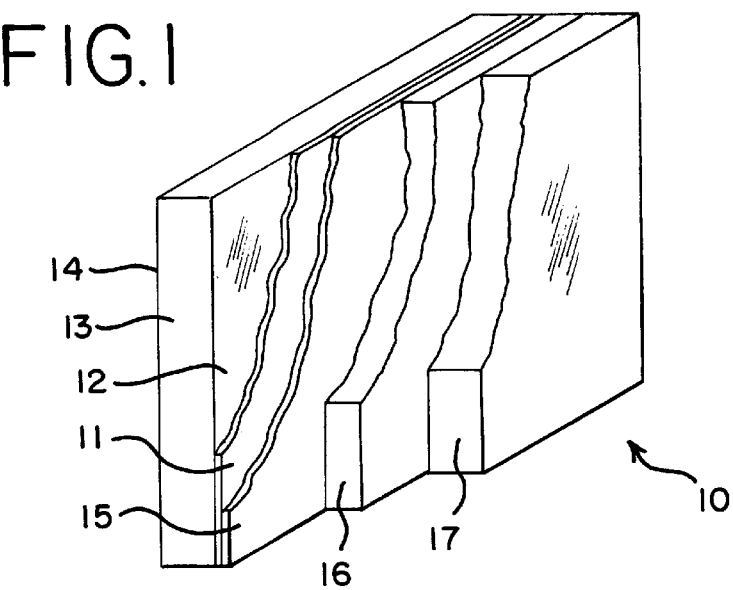
FIG. 1 is a perspective, cutaway view of a laminated glass, single sided mirror of the present invention, not to scale, showing the several layers and materials used.

The present invention comprises a laminated safety glass mirror, shown at 10 in FIG. 1, with a reflective or mirror coating 11 formed on the rear surface 12 of glass panel 13, immediately inward of the outside surface 14 of the mirror assembly. A protective paint coating 15 is applied over the reflective coating 11 immediately adjacent to a bonding layer 16. A second sheet of glass 17 is bonded to the opposite side of the bonding layer 16; that glass sheet 17 can be clear, colored, opaque, or have other characteristics.

Figure 2:
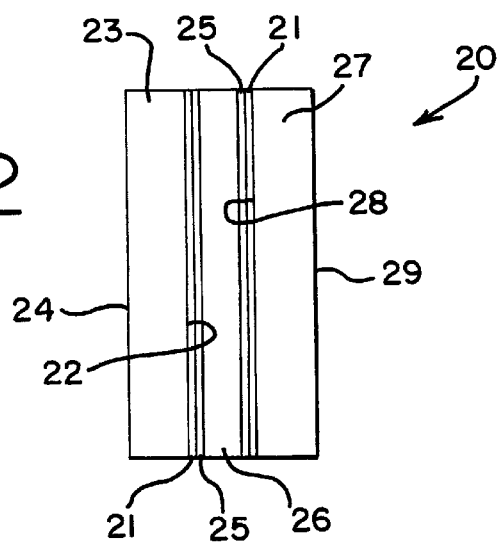
FIG. 2 is a side sectional view through a double-sided mirror of the present invention, not to scale, showing the several layers and materials used.

A dual-sided mirror 20 can be provided, as in FIG. 2, by forming a mirror coating 21 also on the second sheet 27 of laminating glass. In this form of the invention the first laminated glass sheet 23 has a mirror coating 21 and a protective coating 25 thereover on its rear face 22, opposite its exposed face 24. The second laminated glass sheet 27 has a similar mirror coating 21 and protective coating 25 thereover on its rear face 28, opposite its exposed face 29. Second sheet 27 is laminated to first sheet 23 by bonding layer 26, via the protective layers 25, 25 and the mirror coatings 21, 21.

Figure 3:
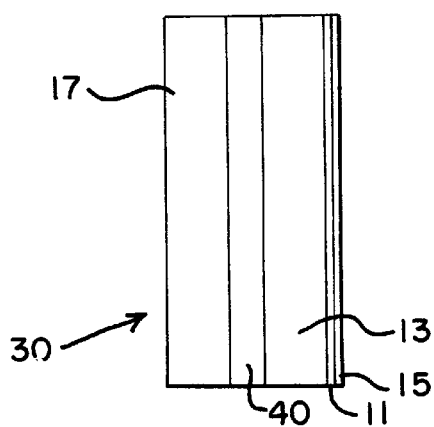
FIG. 3 shows a prior art laminated glass safety mirror in a side sectional view, not to scale.

The present invention is readily contrasted with the prior art of laminated safety mirrors, shown in FIG. 3. The prior art safety mirror 30 has its mirrored glass sheet 13 at the other side of the assembly, with the mirrored surface 11 and protective paint coating 15 located opposite to the bonding layer 40 which joins to the sheet 17.

In particular, this invention incorporates, for durability and ultraviolet light stability, a high modulus tensile strength polyether based aliphatic polyurethane interlayer bonding material 16 or 26. This material provides a bond of sufficient strength to the protective layer 15 or 25, 25, the mirror coating 11 or 21, 21, and the underlying glass sheets 13, 17 or 23, 27, to provide a laminated safety mirror 10 or 20 meeting appropriate safety standards for architectural glass. No loss of adhesion and no chemical attack on or by or deterioration to the mirror coating 11, 21 and the protective layer 15, 25 has been detected. These assembly materials have proven their stability through 5000 hours of QUV exposure without loss of integrity.

A suitable thickness for the mirrored sheet of glass 13 or 23, 27 in the laminate 10 or 20 is 3.0 mm (about ⅛", or 0.125"). A suitable thickness for the non-mirrored glass 17 is slightly less, 2.7 mm (0.106"). A suitable thickness for the bonding interlayer material 16 or 26 is 1.27 mm (0.050"). Slightly thinner materials, either of the interlayer bonding material 16 or 26, or of one or the other of the glass sheets 13, 17 or 23, 27, or all of them, may also provide the safety performance needed. A plastic layer comprised of polycarbonate or acrylic may in some applications be considered for substitution for the layer of non-mirrored glass 17.

The mirror sheets 13, 23, 27 may be of soda lime float glass, with the mirror surface 11, 21 and protective coating 15, 25 applied by Binswanger Mirror, of Grenada, Miss. The high modulus tensile strength polyether based aliphatic polyurethane interlayer bonding material 16, 26 is based on the resin Morthane 399M and is produced and marketed by Morton International of Chicago, Ill., and extruded by JPS, now of Holyoke, Mass. A suitable clear, non-mirrored glass 13, 17, 23, 27 is produced by PPG, of Pittsburgh, Pa., or by Pilkington (LOF) of Toledo, Ohio. Dark substrate glass can be used for sheet 17, such as Greylite 31 in 3.0 mm thickness as produced by PPG or Evergreen in 3.0 mm thickness by Pilkington (LOF). It is preferred to use float glass due to its flatness, optical quality, and availability.

The mirror coating 11, 21, 21 is provided in a conventional manner, consisting of a bright silver surface and then a layer of copper electrolytically deposited directly over the silver surface.

A single layer of protective mirror backing paint 15 or 25, 25 is applied over the metal strata. The interlayer material 16 or 26 is bonded at an autoclave temperature of between 185° F. (85° C.) and 260° F. (125° C.) and at a pressure of between 50 psig and 200 psig.

The laminated safety mirror 10 or 20 is manufactured so that all materials 11 to 17 and 21 to 27 are preferably provided or cut to the exact size desired. Alternatively, they may be provided oversized and later cut to exact sizes desired with a laser cutter or a diamond saw, or the like. In a first method, the glass sheets 17 and mirrors 13, 23, 27 (with coatings 11, 15 or 21, 25, 21, 25) are washed. The layers are combined together in a clean room to reduce contaminates which may come between them. The assemblies then are run down a line at about 3 feet per minute between cold press rolls to squeeze air out from between the layers. This is achieved by measuring all layers of the product, summing the measurements, and reducing the space between the rolls by between 1.524 mm (0.060") and 2.54 mm (0.100") below that measurement.

Then the stacked mirror components are put through a warming oven to obtain outer glass surface temperatures of between 160° F. and 170° F., as read by thermocouple surface probes, e.g., of John Fluke Manufacturing Company, of Everett, Wash. The components are run through a second set of press rolls, also running at 3 feet per minute, and also at a reduced thickness setting to squeeze more air out from between the layers and to pre-bond the mirror layers into the laminate. The space of the press rolls in this step is further reduced by between 1.524 mm (0.060") and 2.54 mm (0.100"). The warming oven incorporates infrared heating elements to penetrate the heat into the glass sheets and the interlayer bonding material as thoroughly as possible, for pre-bonding the laminate together.

Last, the mirror is put into the autoclave, at the temperatures and pressures noted above, to bond the laminate components permanently together.

A second method, avoiding the press rolls and warming chamber, places the mirror, bonding layer, and glass components into a vacuum bag for de-airing. A 76 mm by 1 mm thick edge wrap, to reduce the risk of the material's adhering to the bag, is first applied around all edges of the mirror components; a suitable material is a 3" width wrap no. E3760 P2, distributed by Richmond Aircraft Products, of Norwalk, Calif., a subsidiary of Cadillac Plastics, of Troy, Mich. The mirror layers with edge wrap are then wrapped with a 4 ounce bleeder wrap to remove the air from the layers in this vacuum method; a suitable material is a 5" width A3000 wrap also distributed by Richmond Aircraft Products.

The wrapped components then are placed into a 3.0 mm bag of, for instance, Capran-brand nylon also distributed by Richmond Aircraft Products, and manufactured by Allied Signal Plastics, of Pottsville, Pa. The bag is sealed with RS200 two-sided sealing tape manufactured by Schnee-Morehead company, of Doraville, Ga., and distributed by Richmond Aircraft Products. A vacuum valve is fitted to the bag, for instance a Richmond Aircraft Products no. 5255 3-piece aluminum valve with an M1020 steel curled fastening nut. A ¼" brass, male to male NPT supported, braided, Teflon autoclave hose by Richmond Aircraft Products, no. JTK06DAH03DO30-024 or -036, is attached to the valve. A vacuum of greater than 20 inches of mercury is pulled, then the valve fitting is closed, and the bag containing the mirror components is placed into the autoclave chamber. Alternatively, the vacuum may be pulled in the autoclave chamber. The autoclave and the bag with the vacuum-packed mirror components is preheated for between 30–45 minutes, held at 260° F. and 150 psi pressure for one hour as noted above, and then cooled for 45 minutes.

This invention provides complete protection to the mirror coating and backing 11, 15 or 21, 25 such that cleaning, maintenance, scratching and other damages and defects are avoided. The invention is expected to significantly reduce, if not totally eliminate, black spots and other erosion and corrosion of the mirror surface itself. This invention maintains its safety performance capabilities and durability for both the single and the dual or double sided mirror.

Variations in the materials or methods used will not necessarily depart from the scope and spirit of the invention. All such variations as come within the scope of the appended claims come within the scope of this invention.

I claim as my invention:

1. A laminated safety mirror comprising first and second sheets of glass, each said sheet having opposed first and second sides, the second side of the first sheet being bonded through a bonding sheet to the first side of the second sheet, and wherein:
   the second side of the first sheet has a mirror coating thereon and a protective paint on said coating, and
   the bonding sheet comprises a polyether based aliphatic polyurethane material which is bonded to the protective paint and mirror coating of the first sheet.

2. A laminated safety mirror as defined in claim 1, wherein the first side of the second sheet also has a mirror coating thereon and a protective paint on said coating, adjacent the bonding sheet.

3. A laminated safety mirror as defined in claim 2, wherein the bonding sheet has a high modulus tensile strength.

4. A laminated safety mirror as defined in claim 1, wherein the bonding sheet has a high modulus tensile strength.

5. A laminated safety mirror as defined in claim 1, wherein the first sheet is of soda lime glass.

6. A laminated safety mirror as defined in claim 1, wherein the first sheet is of chemically strengthened glass.

7. A laminated safety mirror as defined in claim 1, wherein the first sheet is of float glass.

8. A laminated safety mirror as defined in claim 1, wherein at least one of the first and second sheets is a heavy security glass.

9. A laminated safety mirror comprising:
   a first sheet of glass having a mirror coating and a protective paint coating on one side of the mirror coating and the sheet having a free side opposite the coating side;
   a durable bonding material comprising a polyether based aliphatic polyurethane material which is applied to the protective paint coating; and
   a second sheet of glass having a first side and a free side opposite thereto, wherein the first side is bonded to the first sheet of glass adjacent the mirror coating and the protective paint coating thereon,
whereby the mirror coating is formed immediately adjacent the free side of the first sheet of glass to provide a bright, close image upon reflection therein.

10. A laminated safety mirror as defined in claim 9, wherein the durable bonding material further has a high modulus tensile strength.

11. A laminated safety mirror as defined in claim 9, wherein at least one of the glass sheets is soda lime glass.

12. A laminated safety mirror as defined in claim 9, wherein at least one of the glass sheets is float glass.

13. A laminated safety mirror as defined in claim 9, wherein at least one of the glass sheets is chemically strengthened.

14. A laminated safety mirror as defined in claim 9, wherein at least one of the glass sheets is a heavy security glass.

15. A laminated safety mirror as defined in claim 9, wherein at least one of the glass sheets is tempered.

16. A laminated safety mirror as defined in claim 9, wherein the first side of the second sheet has a mirror coating thereon and a protective paint on said coating and adjacent the bonding material, thereby to provide a double-sided mirror.

* * * * *